Figure 1:
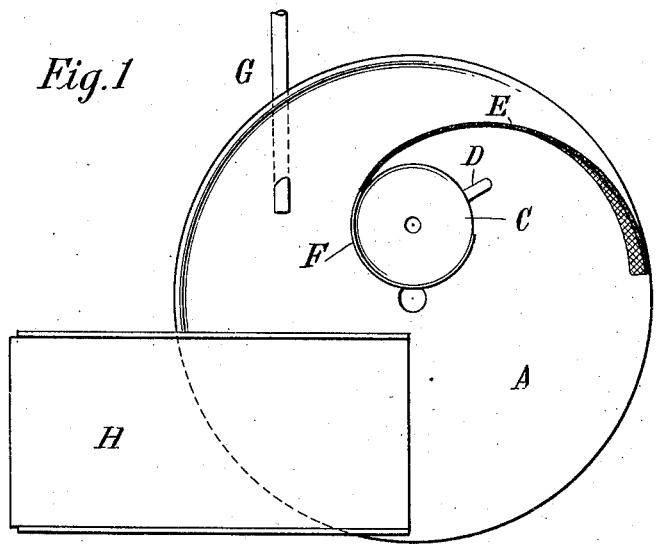

H. E. WOOD.
ORE CONCENTRATOR.
APPLICATION FILED MAR. 7, 1910.

987,209.

Patented Mar. 21, 1911.

Witnesses:
Thomas J. Byrnes
S. S. Dunham

H. E. Wood
Inventor

By his Attorneys
Kerr, Page, Cooper & Hayward

UNITED STATES PATENT OFFICE.

HENRY E. WOOD, OF DENVER, COLORADO.

ORE-CONCENTRATOR.

987,209.  Specification of Letters Patent.  Patented Mar. 21, 1911.

Application filed March 7, 1910. Serial No. 547,626.

*To all whom it may concern:*

Be it known that I, HENRY E. WOOD, a citizen of the United States, residing at Denver, in the city and county of Denver and State of Colorado, have invented certain new and useful Improvements in Ore-Concentrators, of which the following is a full, clear, and exact description.

In apparatus for the selective separation of finely divided materials by the application of the principle of the surface-film tension of liquids, it has heretofore been the practice, exclusively so according to my information, to produce by suitable agencies the flow of a surface stratum of water across a settling tank, to deposit upon or deliver to the surface film of such stratum a mixture of the particles to be separated, to recover those which remain upon the surface by discharging the stratum bearing them into a suitable receptacle and to draw off from the tank the sub-strata into which the remaining portion of such particles have become submerged.

My present invention pertains to apparatus of this general class, but it involves certain improvements in the construction and mode of operation of the same which constitute a new and radical departure from the plans heretofore followed.

The principle of operation and distinguishing features of my improvement are realized in any apparatus which, as a typical embodiment of the invention, may be described in general terms as comprising as elements—(1) a receptacle of substantially cylindrical or preferably conical shape for containing water and provided with an inlet for introducing into it a supply of water in a tangential direction with sufficient force to create a gyratory current therein, and an outlet at the bottom or apex tending to produce a vortex; (2) a smaller receptacle preferably in the form of a cone or funnel supported concentrically, or substantially so, within the larger receptacle and having an outlet from its apex extending out through the wall of the outer receptacle, and (3) a curved screen of wire cloth or other like foraminous material extending across from one receptacle to the other, and of such width as to reach slightly above and below the level of the edge of the inner receptacle, forming a partly submerged foraminous barrier across the surface stratum of the water between the two receptacles, when its level is maintained slightly above the edge of the smaller,— and when these elements or their equivalents are so related and arranged that a dried and finely comminuted mixture of different materials, such as pulverized metalliferous ore, if gently deposited upon the surface of the water in the outer receptacle, or fed upon a sheet of water flowing down an inclined plate into the same, will be separated, the metal particles which are not wetted and which therefore float upon the surface film, being borne around by the gyratory current until they encounter the screen, where, by the films of water which close the meshes of the screen at and slightly above the level of the water, and which they have not sufficient force or momentum to penetrate, they will be deflected in a curved path toward the inner receptacle into which they are carried by the surface stratum of water flowing over its edge, while the submerged particles, sinking in the outer receptacle, are, by the influence of the vortex current induced therein, drawn downward toward the outlet and discharged.

In order, however, to secure the best results in operation, certain details in the construction of such an apparatus are necessary, and for a better understanding of these and the more important and essential features of my invention above generally referred to, I now refer to the annexed drawings for a detailed description of the same.

Figure 2:
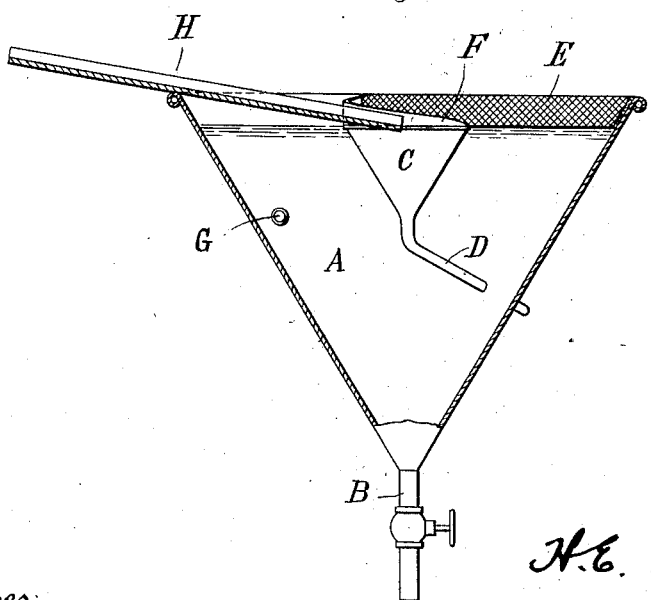

Figure 1 is a plan view of the novel parts of the apparatus, the devices for depositing the finely divided material onto the surface film, and for receiving the discharges from the outlets of the outer and inner receptacles, being omitted, as these are familiar adjuncts of such forms of apparatus. Fig. 2 is a sectional elevation of the two receptacles and their appurtenances showing their construction and relative arrangement.

A is a tank or receptacle which, in order to secure to the full the advantages of the invention, should be of the general form of an ordinary funnel. It is suitably supported and provided with a regulable outlet B at its lower end or apex. Within this receptacle is a smaller one, also by preference in the form of a funnel C, supported within the outer receptacle, its apex being extended by a pipe D running through the wall of the receptacle A. The exact location of the receptacle C is not material. It may be concentric with or to a greater or less extent eccentric to the larger vessel, the essential relation being such that particles deposited and floating upon the surface film of the water in the tank A will be properly intercepted by the screen or barrier E, and directed into the vessel C.

Between the receptacles A and C extends the screen E. It is or may be a strip of wire cloth, perforated sheet metal or the like, and curved from the outer to the inner receptacle, so as not to offer too abrupt an opposition to the flowing surface stratum, but so as to gently and gradually deflect particles floating on the surface film thereof, toward and into the vessel C. On the side of the screen the edge of the inner receptacle is lower than on the opposite side, the edge F, preferably impervious, gradually rising from the point where the floating particles begin to pass into the receptacle up to the point of attachment therewith of the screen. This serves to prevent the water from flowing over into the vessel except along the edge adjacent to the screen.

Water is supplied to the receptacle A through a pipe G and enters it in such a direction and at such pressure as to impart to the body of water in the tank a rotary or gyratory movement with the tendency to the formation of a vortex.

The materials to be separated may be deposited by any known means directly upon the surface of the water in the receptacle A, or upon the surface of a sheet of water flowing into the receptacle down an inclined plate H, and for this latter purpose any suitable appliances may be employed.

The operation of the apparatus has been explained above sufficiently to make further description unnecessary. I desire, however, to point out certain features of the invention which are of importance and value, not only in the particular combination in which they are herein shown, but generally where similar conditions of operation obtain.

It will be observed that the gyratory movement of the surface flow is practically at right angles to the vertical downward movement of the body of liquid and that, therefore, the floating and sinking particles are directed toward different points suitable for their collection. Again, the peculiar action of the screen, which by opposing a surface film to the floating particles, deflects them to a point suitable for their collection, while it permits all fine particles suspended in the water immediately beneath the surface, to pass freely through its interstices, may be advantageously availed of in all cases where it is practicable to interpose such a screen in the path of a moving surface stratum, whether the movement be gyratory or in a more or less direct line.

An apparatus constructed on the principles herein set forth realizes to a very marked degree the properties of the surface film tension of liquids for effecting the selective separation of materials of different surface characteristics, notably of metalliferous ores. It is continuous in operation, easy of management, effective and consistent in performance and very economical, particularly with respect to the capacity of a machine of given dimensions.

What I claim is:

1. In an apparatus for concentrating ores, the combination with a receptacle for containing a body of water, said receptacle provided with a tangential inlet for producing a gyratory movement of the surface stratum of the water therein, a receptacle substantially concentric to and supported within the aforesaid receptacle, and forming an overflow outlet; a guide at the water level for directing floating particles supported on the surface film of the water to said overflow outlet for collection, and means for producing in the body of the water a vertical downward flow for carrying off to a point of discharge the particles suspended in the water.

2. In an apparatus for concentrating ores, the combination with a tank or receptacle for containing a body of water, means for maintaining a flow of the surface stratum of the water therein and a foraminous screen extending across the moving stratum obliquely to the direction of its flow and adapted to deflect the floating particles by the surface films of the water filling its interstices, to a point suitable for their collection while permitting the particles suspended in the water beneath the surface to pass through it.

3. An apparatus for the selective separation of finely divided materials having different surface characteristics, comprising in combination, a tank or receptacle for containing a body of water, means for producing a gyratory movement of the surface stratum of the water therein, and a foraminous screen extending across the moving stratum obliquely to the direction of flow and adapted to deflect floating particles by the surface films of the water filling its interstices to a point suitable for their collection, while permitting the particles suspended in the water beneath the surface to pass through it.

4. An apparatus for the selective separation of finely divided materials having different surface characteristics, comprising in combination, a conical tank for containing a body of water, means for producing a gyratory movement of the surface stratum of the water therein, a receptacle supported within the said tank having an outlet extending through the wall of the latter and a curved foraminous screen extending between the tank and the receptacle across the moving surface stratum and adapted to direct the floating particles to the smaller receptacle into which the water in the tank overflows.

5. An apparatus for the selective separation of finely divided materials having different surface characteristics, comprising in combination, a conical tank for containing a body of water and having an outlet at its apex, a pipe for supplying water to said tank tangentially and under pressure, a smaller receptacle supported within the tank and having an outlet extending through the wall thereof and a curved foraminous screen extending between the outer tank and inner receptacle across the moving surface stratum of water contained in the tank and adapted to direct floating particles to the smaller receptacle into which the water from the tank overflows.

6. An apparatus for the selective separation of finely divided materials having different surface characteristics, comprising in combination, a funnel shaped tank for containing a body of water, a smaller funnel shaped receptacle supported therein, means for producing a gyratory flow of the surface stratum of water within the larger tank, a curved foraminous screen extending between the outer and inner receptacles, the edge of the inner receptacle adjacent to the screen being lower than the other side to permit an overflow of water from the outer tank into the inner receptacle on the side of the screen.

7. An apparatus for the selective separation of finely divided materials having different surface characteristics, comprising in combination an outer tank and a smaller tank supported within the same, means for producing a gyratory flow of the water contained within the outer tank and a foraminous screen extending obliquely across the moving surface stratum of the water between the two tanks and of such width as to reach slightly above and below the surface of the water when at a level sufficient to cause an overflow from the outer to the inner tank.

In testimony whereof I affix my signature in the presence of two subscribing witnesses.

HENRY E. WOOD.

Witnesses:
J. C. EVANS,
O. E. WOOD.